United States Patent
Pruss et al.

(10) Patent No.: US 10,577,488 B2
(45) Date of Patent: Mar. 3, 2020

(54) RUBBER MIXTURE, VULCANIZATE OF THE RUBBER MIXTURE, AND VEHICLE TIRES

(71) Applicant: Continental Reifen Deutschland GmbH, Hannover (DE)

(72) Inventors: Noa Pruss, Isernhagen (DE); Julia Grosse, Seelze (DE); Carla Recker, Hannover (DE); Katharina Herzog, Harsum (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 16/097,847

(22) PCT Filed: Feb. 20, 2017

(86) PCT No.: PCT/EP2017/053722
§ 371 (c)(1),
(2) Date: Oct. 31, 2018

(87) PCT Pub. No.: WO2017/190859
PCT Pub. Date: Nov. 9, 2017

(65) Prior Publication Data
US 2019/0233624 A1 Aug. 1, 2019

(30) Foreign Application Priority Data

May 4, 2016 (DE) .................. 10 2016 207 744

(51) Int. Cl.
| | | |
|---|---|---|
| C08L 9/06 | (2006.01) | |
| C08C 19/20 | (2006.01) | |
| C08C 19/00 | (2006.01) | |
| C08L 19/00 | (2006.01) | |
| B60C 1/00 | (2006.01) | |
| C08L 15/00 | (2006.01) | |
| B29B 7/74 | (2006.01) | |
| C08K 3/04 | (2006.01) | |
| C08K 3/36 | (2006.01) | |

(52) U.S. Cl.
CPC .............. *C08L 9/06* (2013.01); *B29B 7/7495* (2013.01); *B60C 1/00* (2013.01); *C08C 19/00* (2013.01); *C08C 19/20* (2013.01); *C08K 3/04* (2013.01); *C08K 3/36* (2013.01); *C08L 15/00* (2013.01); *C08L 19/00* (2013.01); *B60C 1/0016* (2013.01); *C08L 2312/00* (2013.01)

(58) Field of Classification Search
CPC ..................................................... C08C 19/20
See application file for complete search history.

(56) References Cited

U.S. PATENT DOCUMENTS

| | | | | |
|---|---|---|---|---|
| 8,722,810 B2* | 5/2014 | Cheng | ........................ | C08F 8/34 |
| | | | | 525/331.9 |
| 2010/0069568 A1 | 3/2010 | Thiele et al. | | |
| 2010/0105827 A1* | 4/2010 | Tanaka | .................. | B60C 1/0016 |
| | | | | 524/566 |

FOREIGN PATENT DOCUMENTS

| | | |
|---|---|---|
| EP | 2987813 A1 | 2/2016 |
| JP | 2010513697 A | 4/2010 |
| WO | 03031484 A1 | 4/2003 |
| WO | 2007047943 A2 | 4/2007 |

OTHER PUBLICATIONS

International Search Report dated May 17, 2017 of International application PCT/EP2017/053722 on which this application is based.

* cited by examiner

*Primary Examiner* — Vickey Nerangis
(74) *Attorney, Agent, or Firm* — David L. Cate; Gregory Adams

(57) ABSTRACT

A vulcanizate of a rubber mixture for a vehicle tire, the rubber mixture containing at least one filler and 10 to 100 phr of at least one polymer A of the following formula:

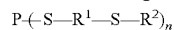

where S is a sulfur atom, and P is a polymer chain which is obtainable by anionic polymerization of at least one conjugated diene and optionally one or more vinylaromatic compounds and which has optionally been chain end-modified, $R^1$ is most preferably $C_1$-$C_8$-alkyl, $R^2$ is preferably selected from H and —$SiR^3R^4R^5$ in which $R^3$, $R^4$ and $R^5$ are independently selected from H, $C_1$-$C_{16}$-alkyl, $C_6$-$C_{16}$-aryl and $C_7$-$C_{16}$-aralkyl, and n is an integer selected from 1 to 200, where the —S—$R^1$—S—$R^2$ group(s) are bonded to the backbone of the polymer chain P.

11 Claims, No Drawings

RUBBER MIXTURE, VULCANIZATE OF THE RUBBER MIXTURE, AND VEHICLE TIRES

The invention relates to a rubber mixture, especially for vehicle tires, to a vulcanizate of the rubber mixture and to a vehicle tire.

The rubber compositions of the individual components of vehicle tires, especially the composition of the tread, determine the running properties thereof to a high degree.

The mixture and vulcanizate properties are influenced by adding a wide variety of different admixtures to the mixtures and/or using specific polymers. Examples of admixtures that should be mentioned here are fillers (e.g. carbon black), plasticizers, aging stabilizers and crosslinking systems composed of sulfur, accelerator and activator.

Crosslinking of the polymer chains by means of the vulcanization system creates a three-dimensional wide-mesh chemical network, as a result of which the rubber mixture, depending on the crosslinking density, becomes harder and more resistant to cracking, for example, especially as a result of an elevated tear propagation resistance.

Crosslinking forms what are called network nodes where the polymer chains are linked to one another, usually via bridges, for example sulfur bridges in the case of sulfur crosslinking of diene rubbers.

The network nodes are typically randomly distributed, since there are significantly more crosslinking sites available (i.e. double bonds of diene rubbers, especially in the case of sulfur crosslinking) than the number of network nodes that form in the vulcanization. As a result of random distribution, essential physical properties of vulcanizates can be improved only to a limited degree. Particularly properties or predictors for the trade-off between rolling resistance and wet grip and the abrasion characteristics are of interest here in order to meet rising demands on vehicle tires comprising the vulcanizates.

WO2008/076875A1 describes a composition consisting of a) an uncrosslinked elastomer polymer and b) a sulfidic modifier of the formula AS—Y—$Z_m$ where Y is defined as $C_{12}$-$C_{100}$ aralkyl, aryl, alkyl or dialkyl ether and may additionally optionally be substituted. The vulcanizates disclosed in WO2008/076875A1 have lower rolling resistance in the presence of silica as filler.

It is therefore an object of the invention, proceeding from the prior art, to provide a sulfur-crosslinkable rubber mixture, especially for vehicle tires, which features a further improvement in the trade-off between rolling resistance behavior and wet grip properties, with the further properties, especially abrasion characteristics, remaining at the same level or even likewise being improved.

This object is achieved by a rubber mixture comprising at least the following constituents:
at least one filler and
10 to 100 phr of at least one polymer A of the following formula I):

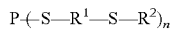  I)

where
S is a sulfur atom, and
P is a polymer chain which is obtainable by anionic polymerization of at least one conjugated diene and optionally one or more vinylaromatic compounds and which has optionally been chain end-modified,
$R^1$ is independently selected from $C_1$-$C_{11}$-alkyl, $C_6$-$C_{11}$-aryl, $C_7$-$C_{11}$-aralkyl and $C_2$-$C_{11}$-dialkyl ether, preferably $C_1$-$C_{11}$-alkyl, more preferably $C_1$-$C_8$-alkyl, $R^2$ is independently selected from H, $C_1$-$C_{11}$-alkyl, $C_6$-$C_{11}$-aryl, $C_2$-$C_{11}$-dialkyl ether and —$SiR^3R^4R^5$ in which $R^3$, $R^4$ and $R^5$ are independently selected from H, $C_1$-$C_{16}$-alkyl, $C_6$-$C_{16}$-aryl and $C_7$-$C_{16}$-aralkyl, and $R^2$ is preferably independently selected from H and —$SiR^3R^4R^5$ in which $R^3$, $R^4$ and $R^5$ are independently selected from H, $C_1$-$C_{16}$-alkyl, $C_6$-$C_{16}$-aryl and $C_7$-$C_{16}$-aralkyl, and n is an integer selected from 1 to 200, preferably 1 to 100, more preferably 1 to 50, where the —S—$R^1$—S—$R^2$ group(s) are bonded to the backbone of the polymer chain P.

It has been found that, surprisingly, at least one polymer A as defined above in combination with at least one filler improves the trade-off between rolling resistance and wet grip, with equal or improved abrasion characteristics.

At the same time, the other tire properties remain at approximately the same high level or are even improved, with the tear properties of the rubber mixture in particular remaining at approximately the same high level or even being improved.

It is a further object of the present invention to provide a vehicle tire which has an improvement over the prior art in terms of the trade-off between rolling resistance and wet grip, with the abrasion characteristics remaining at least at the same level or likewise being improved.

The object is achieved in that the vehicle tire includes, at least in one component, at least one vulcanizate of at least one sulfur-crosslinkable rubber mixture having the features mentioned above or detailed further down.

Vehicle tires that comprise the rubber mixture of the invention at least in one component, preferably at least in the tread, have improved, and hence reduced, rolling resistance with a simultaneous improvement in the trade-off between rolling resistance and wet grip.

In the context of the present invention, vehicle tires are understood to mean pneumatic vehicle tires and solid rubber tires, including tires for industrial and construction site vehicles, and truck, car and two-wheeler tires.

The rubber mixture of the invention is additionally also suitable for other components of vehicle tires, for example sidewall, flange profile in particular, and also inner tire components. The rubber mixture of the invention is additionally also suitable for other technical rubber articles, such as bellows, conveyor belts, air springs, belts, drive belts or hoses, and also footwear soles.

There follows a detailed description of the constituents of the sulfur-crosslinkable rubber mixture of the invention. All the details given are also applicable to the vehicle tire of the invention that includes the rubber mixture of the invention at least in one component.

It is essential to the invention that the rubber mixture contains 10 to 100 phr of at least one polymer A of the formula I) shown above.

In the context of the present invention, "polymer A" is understood to mean a polymer of the above-described formula I) having the above-described features including the embodiments and features mentioned below.

Polymer A is prepared by means of a process comprising the following steps:
(i) anionically polymerizing at least one conjugated diene and optionally one or more vinylaromatic compounds to obtain an anionic living polymer chain,
(ii) terminating the polymerization and
(iii) reacting the polymer chain with a compound of the following formula II) in the presence of a free-radical initiator:

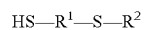  II)

in which

S is a sulfur atom, $R^1$ is independently selected from $C_1$-$C_{11}$-alkyl, $C_6$-$C_{11}$-aryl, $C_7$-$C_{11}$-aralkyl and $C_2$-$C_{11}$-dialkyl ether, preferably $C_1$-$C_{11}$-alkyl, more preferably $C_1$-$C_8$-alkyl, and $R^2$ is independently selected from H, $C_1$-$C_{11}$-alkyl, $C_6$-$C_{11}$-aryl, $C_7$-$C_{11}$-aralkyl, $C_2$-$C_{11}$-dialkyl ether and —$SiR^3R^4R^5$ in which $R^3$, $R^4$ and $R^5$ are independently selected from H, $C_1$-$C_{16}$-alkyl, $C_6$-$C_{16}$-aryl and $C_7$-$C_{16}$-aralkyl, and $R^2$ is preferably independently selected from H and —$SiR^3R^4R^5$ in which $R^3$, $R^4$ and $R^5$ are independently selected from H, $C_1$-$C_{16}$-alkyl, $C_6$-$C_{16}$-aryl and $C_7$-$C_{16}$-aralkyl.

The polymer chain P of the polymer is obtainable by anionic polymerization of at least one conjugated diene and optionally one or more vinylaromatic compounds, usually in the presence of an initiator. After the polymerization has been terminated, the polymer chain P is reacted with a compound of the formula II) in the presence of a free-radical initiator. This results in modification of the backbone of the polymer chain with at least one group of the formula —S—$R^1$—S—$R^2$. According to the invention, a polymer having a polymer chain modified in the polymer backbone by up to 200 groups of the formula —S—$R^1$—S—$R^2$ is used in the rubber mixture. The modification of the backbone of the polymer means a modification of a repeat unit (monomer unit) of the polymer chain which is not a terminal repeat unit and where the repeat unit derives from a conjugated diene. For example, the modification of the backbone of a polymer chain composed of the monomer units $M_1$ to $M_{1000}$ corresponds to a modification of one or more of the monomer units $M_2$ to $M_{999}$. In the context of the present invention, a modification of the monomer units $M_1$ and/or $M_{1000}$ is not a modification of the backbone of the polymer chain but a modification of the polymer chain end (chain end modification). A repeat unit may have been modified with a maximum of one group of the formula —S—$R^1$—S—$R^2$.

The polymer A is thus a polymer that has been modified along the chains.

Such a modification along the polymer chain is also referred to as backbone modification. The modification is preferably effected on vinylic double bonds as present, for example, in polybutadiene or styrene-butadiene copolymers, or may be present according to the microstructure established.

In the rubber mixture of the invention, the polymers A (and polymers of any other diene rubbers present) are sulfur-crosslinked at accessible double bonds of the polymer chains in the vulcanization. In this case, the sulfur atoms bonded to $R^2$ in the side groups —S—$R^1$—S—$R^2$, on completion of elimination of the $R^2$ group, in addition to the sulfur vulcanization system present (see below), can intervene in the vulcanization and form local network nodes.

It will be clear to the person skilled in the art that the specification relating to the polymer of the above formula I) relates to the starting state of the constituents of the sulfur-crosslinkable rubber mixture and the protecting groups are detached during the mixing operation—with the other customary constituents of a rubber mixture for vehicle tires—and/or the vulcanization and the respective sulfur atoms chemically react.

By controlling the monomers involved, it is thus also possible to influence the architecture of these (possible) additional network nodes. In this context, the sequence of the monomers having vinylic double bonds in particular plays a role, since the modifier II) here preferably joins onto these via a thiol-ene reaction.

It has been found that vulcanizates of the rubber mixture of the invention, by comparison with the prior art, have an improvement in the trade-off between indicators of rolling resistance and of wet grip. At the same time, abrasion characteristics remain at a comparable level or are even likewise improved.

The chain ends of the polymer chain P may optionally be modified completely or partially by functional groups. Chain end-modifying groups, the generation thereof in a polymer during the polymerization, for example by means of functional initiators, and/or the binding thereof to the chain end of a polymer prepared by anionic polymerization are known to the person skilled in the art and are described, for example, in WO 2014/040640, WO 2014/040639, WO2015/010710, WO 2015/086039 and WO 2015/055252, and in European patent application no. 15 181 760.8 which is incorporated here by reference. The optional chain end modification of the polymer chain P can optionally also be effected by a —S—$R^1$—S—$R^2$ group, in which case these group(s) are not taken into account in the determination of the parameter value n in formula I).

Illustrative conjugated dienes suitable for preparation of the polymer chain P include: 1,3-butadiene, 2-($C_1$-$C_5$-alkyl)-1,3-butadiene, especially isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene and 1,3-cyclooctadiene. A mixture of two or more conjugated dienes may be used. Preferred conjugated dienes include: 1,3-butadiene and isoprene. In one embodiment, the conjugated diene is 1,3-butadiene.

The at least one conjugated diene is used for preparation of the polymer chain P preferably in a total amount of 30% to 100% by weight, based on the total amount of monomers.

The vinylaromatic compound used optionally for preparation of the polymer chain P includes monovinylaromatic compounds, i.e. compounds having just one vinyl group bonded to an aromatic group, and di-, tri- etc. vinylaromatic compounds that have two or more vinyl groups bonded to an aromatic group. Illustrative vinylaromatic compounds that can optionally be used with the at least one diene for preparation of the polymer chain P include: styrene, $C_1$-$C_4$-alkyl-substituted styrene, especially 2-methylstyrene, 3-methylstyrene, 4-methylstyrene, 2,4-dimethylstyrene, 2,4,6-trimethylstyrene, α-methylstyrene, 2,4-diisopropylstyrene and 4-tert-butylstyrene, stilbene, vinylbenzyldimethylamine, 4-vinylbenzyl dimethylaminoethyl ether, N,N-dimethylaminoethylstyrene, tert-butoxystyrene, vinylpyridine and divinylaromatic compounds, especially 1,2-divinylbenzene, 1,3-divinylbenzene and 1,4-divinylbenzene. A mixture of two or more of these may be used. A vinylaromatic compound used with preference is a monovinylaromatic compound, more preferably styrene.

The vinylaromatic compounds may generally be used in a total amount of up to 70% by weight, especially 5% to 70% by weight, preferably up to 60% by weight and even more preferably up to 50% by weight, based on the total amount of monomers, with the proviso that di-, tri- and higher vinylaromatic compounds are used in a total amount of not more than 1% by weight, based on the total amount of monomers. Even though there are no general restrictions with regard to the proportion of styrene which is used for preparation of the polymer chain, styrene typically represents 5% to 70% by weight, preferably 5% to 60% by weight and more preferably 5% to 50% by weight of the total amount of monomers. An amount of less than 5% by weight of styrene can lead to a worsened balance of rolling resistance, wet skid resistance and abrasion resistance and to reduced mechanical strength properties, while an amount of more than 70% by weight can result in elevated hysteresis losses.

Other comonomers than the conjugated diene and the vinylaromatic compound may be used in the preparation of the polymer chain P and include acrylic monomers such as acrylonitrile, acrylates, e.g. acrylic acid, methyl acrylate, ethyl acrylate, propyl acrylate and butyl acrylate, and methacrylates, e.g. methyl methacrylate, ethyl methacrylate, propyl methacrylate and butyl methacrylate. The total amount of the monomers other than the conjugated diene and the vinylaromatic compound is preferably not greater than 10% by weight, more preferably not greater than 5% by weight, of all monomers. In a particularly preferred embodiment, no other comonomers are used aside from the conjugated diene and optionally the vinylaromatic compound.

In a particularly preferred embodiment, the polymer chain P is obtainable by random copolymerization of 1,3-butadiene as conjugated diene with styrene as vinylaromatic compound, preference being given to using styrene in an amount of 5% to 70% by weight.

The polymer chain P may be a random or block copolymer. The polymer chain P may also have polymer sections of different microstructures each with random styrene distribution. Preferably 40% by weight or more of the repeat styrene units are incorporated individually in the polymer chain, and 10% by weight or less are "blocks" of eight or more successively incorporated styrene units. A polymer outside these limits can lead to elevated hysteresis losses. The length of the successively incorporated vinylaromatic units including the repeat styrene units can be determined by an ozonolysis gel permeation chromatography method that has been developed by Tanaka et al. (Polymer, vol. 22, 1721-1723 (1981)).

The polymerization of the at least one conjugated diene and optionally one or more vinylaromatic compounds to obtain the polymer chain P is usually conducted in the presence of one or more initiators. Suitable initiators include organometallic compounds, specifically organolithium compounds, for example ethyllithium, propyllithium, n-butyllithium, sec-butyllithium, tert-butyllithium, phenyllithium, hexyllithium, 1,4-dilithio-n-butane, 1,3-di(2-lithio-2-hexyl)benzene and 1,3-di(2-lithio-2-hexyl)benzene and 1,3-di(2-lithio-2-propyl)benzene. Among these, preference is given to n-butyllithium and sec-butyllithium. The amount of the initiator is chosen on the basis of the amount of monomer to be polymerized and of the target molecular weight of the polymer chain P. The total amount of initiator is typically 0.05 to 20 mmol, preferably 0.1 to 10 mmol, per 100 g of monomers (total amount of polymerizable monomers).

It is also possible to add a polar coordinator compound to the monomer mixture or polymerization reaction in order to adjust the microstructure of the conjugated diene component, i.e. the content of vinyl bonds, or the composition distribution of any vinylaromatic compound present in the polymer chain P. It is possible to use two or more polar coordinator compounds simultaneously. Polar coordinator compounds are generally Lewis bases, and suitable illustrative Lewis bases include: ether compounds, for example diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, $C_1$-$C_8$-alkyl tetrahydrofuryl ether (including methyl tetrahydrofuryl ether, ethyl tetrahydrofuryl ether, propyl tetrahydrofuryl ether, butyl tetrahydrofuryl ether, hexyl tetrahydrofuryl ether and octyl tetrahydrofuryl ether), tetrahydrofuran, 2,2-(bistetrahydrofurfuryl)propane, bistetrahydrofurfuryl formal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene and dimethoxyethane, and tertiary amines such as triethylamine, pyridine, N,N,N',N'-tetramethylethylenediamine, dipiperidinoethane, methyl ether of N,N-diethylethanolamine, ethyl ether of N,N-diethylethanolamine, N,N-diethylethanolamine and dimethyl-N,N-tetrahydrofurfurylamine. Examples of preferred polar coordinator compounds are described in WO 2009/148932, which is incorporated here by reference.

The polar coordinator compound is typically added in a molar ratio of polar coordinator compound to initiator compound of 0.012:1 to 10:1, preferably 0.1:1 to 8:1 and more preferably 0.25:1 to about 6:1.

The polymerization method used for preparation of the polymer chain is preferably conducted in the form of a solution polymerization in which the polymer formed is essentially soluble in the reaction mixture, or in the form of a suspension/triphasic (slurry) polymerization in which the polymer formed is essentially insoluble in the reaction mixture. Preferably, the polymer chain P is obtained in a solution polymerization. The solvent used is conventionally a hydrocarbon that does not deactivate the initiator, the coordinator compound or the active polymer chain. Two or more solvents may be used in combination. Illustrative solvents include aliphatic and aromatic solvents. Specific examples are (including all constitutional isomers): propane, butane, pentane, hexane, heptane, octane, butene, propene, pentene, benzene, toluene, ethylbenzene and xylene. Solution polymerization is typically conducted at a pressure of not more than 10 MPa (absolute), preferably within a temperature range from 0 to 120° C. The polymerization can be conducted batchwise, continuously or semicontinuously.

In the elastomeric polymer of the formula I), $R^1$ is independently selected from $C_1$-$C_{11}$-alkyl, $C_6$-$C_{11}$-aryl, $C_7$-$C_{11}$-aralkyl and $C_2$-$C_{11}$-dialkyl ether, preferably $C_1$-$C_{11}$-alkyl, more preferably $C_1$-$C_8$-alkyl. Selected examples of $R^1$ are ethylidene [—(CH$_2$)$_2$—], propylidene [—(CH$_2$)$_3$-] and hexylidene [—(CH$_2$)$_6$—].

$R^2$ is independently selected from H, $C_1$-$C_{11}$-alkyl, $C_6$-$C_{11}$-aryl, $C_7$-$C_{11}$-aralkyl, $C_2$-$C_{11}$-dialkyl ether and —SiR$^3$R$^4$R$^5$ in which $R^3$, $R^4$ and $R^5$ are independently selected from H, $C_1$-$C_{16}$-alkyl, $C_6$-$C_{16}$-aryl and $C_7$-$C_{16}$-aralkyl. $R^2$ is preferably independently selected from H and —SiR$^3$R$^4$R$^5$ in which $R^3$, $R^4$ and $R^5$ are independently selected from H, $C_1$-$C_{16}$-alkyl, $C_6$-$C_{16}$-aryl and $C_7$-$C_{16}$-aralkyl. Selected examples of $R^2$ are —SiMe$_3$, —SiEt$_3$, —SiPr$_3$, —SiMe$_2$Et, —SiMe$_2$Pr, —SiMe$_2$Bu, —SiMe$_2$(C$_6$H$_{13}$) and —SiMe$_2$(C$_8$H$_{17}$), where Pr is n-propyl or i-propyl and Bu is n-butyl, t-butyl or i-butyl.

Selected examples of the —S—R$^1$—S—R$^2$ substructure in formula I) and formula II) are —S—(CH$_2$)$_2$—S—SiMe$_3$, —S—(CH$_2$)$_2$—S—SiMe$_2$Et, —S—(CH$_2$)$_2$—S—SiMe$_2$Pr, —S—(CH$_2$)$_2$—S—SiMe$_2$Bu, —S—(CH$_2$)$_2$—S-SiEt$_3$, —S—(CH$_2$)$_3$—S—SiMe$_3$, —S—(CH$_2$)$_3$—S—SiMe$_2$Et, —S—(CH$_2$)$_3$—S—SiMe$_2$Pr, —S—(CH$_2$)$_3$—S—SiMe$_2$Bu, —S—(CH$_2$)$_3$—S-SiEt$_3$, —S—(CH$_2$)$_6$—S—SiMe$_3$, —S—(CH$_2$)$_6$—S—SiMe$_2$Et, —S—(CH$_2$)$_6$—S—SiMe$_2$Pr, —S—(CH$_2$)$_6$—S—SiMe$_2$Bu and —S—(CH$_2$)$_6$—S-SiEt$_3$.

n is an integer selected from 1 to 200, preferably 1 to 100, more preferably 1 to 50.

Step (i) of the process corresponds to the above-described preparation of the polymer chain P, and for details and conditions and preferred embodiments reference is made to the above-described preparation of the polymer chain P.

The anionic polymerization of step (i) and hence the anionic living polymer chain obtained is terminated in a step (ii). This polymerization or chain termination can be effected in a conventionally known manner by means of a proton source or a functional reagent. An agent for chain termination contains at least one active hydrogen atom that can react with and protonates the anionic polymer chain end. A single chain terminator or two or more in combination may be used. Suitable chain terminators include water (water vapor), alcohols, amines, mercaptans and organic acids, preferably alcohols and more preferably $C_1$-$C_4$ alcohols, preferably methanol and ethanol and more preferably methanol. Rather than or together with the chain terminator, it is also possible to use one or more compounds that modify the chain end in order to modify the polymer chain at the chain ends. Corresponding compounds are known to the person skilled in the art from the prior art, and reference is made by way of example to the disclosure of the following documents already cited above: WO 2014/040640, WO 2014/040639, WO 2015/086039 and WO 2015/055252.

After the chain termination in step (ii), the resultant polymer that has been deactivated at the chain ends is reacted with a compound of the formula II) in the presence of a free-radical initiator. The reaction leads to modification of the backbone of the polymer chain and hence to an elastomeric polymer of the formula I). The modification in step (iii) is typically conducted directly after step (ii). Optionally, however, after step (ii), the solvent can be removed and/or exchanged before the modification in step (iii) is conducted.

The amount of the compound(s) of the formula II) added in step (iii) depends on the length of the polymer chain P and the desired index n in formula I). Typically, this amount is 0.01% to 10% by weight, based on the total amount of all monomers, preferably 0.025% to 7.5% by weight and more preferably 0.05% to 5% by weight.

The free-radical initiator is typically added in an amount of 1 to 25 mol %, preferably 2 to 20 mol %, based on the amount of the compound(s) of the formula II) used. The reaction in step (iii) is generally conducted at a temperature of 50 to 180° C., preferably at 60 to 150° C.

The free-radical initiator used in step (iii) may be selected, for example, from peroxides, azo initiators and photoinitiators, and two or more free-radical initiators may be used in combination. Preference is given to using a peroxide as free-radical initiator, for example lauroyl peroxide, dicumyl peroxide, benzoyl peroxide, tert-butyl peroxide or 1,1-di(tert-butylperoxy)-3,3,5-trimethylcyclohexane. One example of an azo initiator is 2,2'-azobis(2-methylpropionitrile).

The reaction mixture obtained in step (iii) is typically worked up by conventional methods, giving the polymer A. Workup means the removal of solvents by distillation or vacuum evaporation. In this context, further polymers and customary constituents or products of side reactions of the desired polymerization as part of the polymer composition that are formed in the polymerization process may be present as part of the polymer A, but do not constitute an elastomeric polymer of formula I) of the invention.

The statements of amount "10 to 100 phr of polymer A"— or the preferred embodiments—thus relate to the total amount of polymer A present including components that are present as customary impurities and are selected from (i) components that are obtained as a result of the polymerization to obtain the polymer chain P or are added to the polymerization, and (ii) components that remain after removal of the solvents from the polymerization.

In an advantageous embodiment of the invention, the rubber mixture contains 100 phr of the polymer A, i.e. it does not contain any further rubber, and all other weight figures are based on 100% by weight of the polymer A, with the above-described exception that impurities may be present.

In a further advantageous embodiment of the invention, the rubber mixture contains 10 to 90 phr, more preferably 40 to 90 phr, of the polymer A in combination with 10 to 90 phr or more preferably 10 to 60 phr of at least one further rubber.

The at least one further rubber is preferably selected from the group consisting of natural polyisoprene and/or synthetic polyisoprene and/or butadiene rubber and/or solution-polymerized styrene-butadiene rubber and/or emulsion-polymerized styrene-butadiene rubber and/or liquid rubbers (having a molecular weight Mw by GPC of greater than 20 000 g/mol) and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or isoprene-butadiene copolymer and/or hydrogenated styrene-butadiene rubber.

Nitrile rubber, hydrogenated acrylonitrile-butadiene rubber, chloroprene rubber, butyl rubber, halobutyl rubber or ethylene-propylene-diene rubber in particular are used in the production of technical rubber articles, such as belts, drive belts and hoses, and/or footwear soles.

The further rubber is preferably at least one further diene rubber. The polymer A present is likewise a diene rubber.

Diene rubbers refer to rubbers that result from polymerization or copolymerization of dienes and/or cycloalkenes and thus have C=C double bonds either in the main chain or in the side groups.

The at least one further diene rubber is preferably selected from the group consisting of synthetic polyisoprene (IR) and natural polyisoprene (NR) and styrene-butadiene rubber (SBR) and polybutadiene (BR).

The natural and/or synthetic polyisoprene of all embodiments may be either cis-1,4-polyisoprene or 3,4-polyisoprene. However, the use of cis-1,4-polyisoprenes with a cis-1,4 content >90% by weight is preferred. Firstly, it is possible to obtain such a polyisoprene by stereospecific polymerization in solution with Ziegler-Natta catalysts or using finely divided lithium alkyls. Secondly, natural rubber (NR) is one such cis-1,4-polyisoprene; the cis-1,4 content in the natural rubber is greater than 99% by weight.

In addition, a mixture of one or more natural polyisoprenes with one or more synthetic polyisoprenes is also conceivable.

If the rubber mixture of the invention includes at least one butadiene rubber (=BR, polybutadiene) as a further diene rubber in addition to the polymer A) present, the type of rubber in question may comprise any of the types known to the skilled person. These include so-called high-cis and low-cis types, wherein polybutadiene having a cis content of not less than 90% by weight is referred to as high-cis type and polybutadiene having a cis content of less than 90% by weight is referred to as low-cis type. An example of a low-cis polybutadiene is Li—BR (lithium-catalyzed butadiene rubber) having a cis content of 20% to 50% by weight. A high-cis BR achieves particularly good abrasion properties and low hysteresis of the rubber mixture.

The one or more polybutadienes used may have been end group-modified with modifications and functionalizations and/or functionalized along the polymer chains. The modification may be a modification having hydroxyl groups and/or ethoxy groups and/or epoxy groups and/or siloxane groups and/or amino groups and/or aminosiloxane and/or carboxyl groups and/or phthalocyanine groups and/or silane-sulfide groups. However, further modifications known to those skilled in the art, also known as functionalizations, are also suitable. Metal atoms may be a constituent of such functionalizations.

In the case where at least one styrene-butadiene rubber (styrene-butadiene copolymer) is present in the rubber mixture as a further diene rubber in addition to the polymer A, this may be either solution-polymerized styrene-butadiene rubber (SSBR) or emulsion-polymerized styrene-butadiene rubber (ESBR), and it is also possible to use a mixture of at least one SSBR and at least one ESBR. The terms "styrene-butadiene rubber" and "styrene-butadiene copolymer" are used synonymously in the context of the present invention. The styrene-butadiene copolymer used may be end group-modified and/or functionalized along the polymer chains with the modifications and functionalizations recited above for the polybutadiene.

In the context of the present application, the styrene-butadiene rubber (styrene-butadiene copolymer) from the group of the further diene rubbers is a styrene-butadiene rubber known in the prior art.

It is essential to the invention that the rubber mixture contains at least one filler. Preferably, the rubber mixture contains 20 bis 300 phr of at least one filler.

The latter may be any of the fillers conceivable in the rubber industry, such as carbon black and/or silica or other fillers, for example aluminosilicates, kaolin, chalk, starch, magnesium oxide, titanium dioxide or rubber gels, and fibers (for example aramid fibers, glass fibers, carbon fibers, cellulose fibers).

Further optionally reinforcing fillers are, for example, carbon nanotubes ((CNT), including discrete CNTs, what are called hollow carbon fibers (HCF) and modified CNTs containing one or more functional groups, such as hydroxyl, carboxyl and carbonyl groups), graphite and graphene, and so-called "carbon-silica dual-phase fillers".

In the context of the present invention, zinc oxide does not belong to the group of fillers.

The filler is preferably at least one silica and/or at least one carbon black.

Possible carbon blacks are all types of carbon black known to a person familiar with the technical field.

In one embodiment, the carbon black has an iodine number in accordance with ASTM D 1510, which is also referred to as iodine adsorption number, between 30 g/kg and 250 g/kg, preferably 30 to 180 g/kg, more preferably 40 to 180 g/kg, and most preferably 40 to 130 g/kg, and a DBP number in accordance with ASTM D 2414 of 30 to 200 mL/100 g, preferably 70 to 200 mL/100 g, more preferably 90 to 200 mL/100 g.

The DBP number in accordance with ASTM D 2414 determines the specific absorption volume of a carbon black or a light-colored filler by means of dibutyl phthalate.

The use of such a type of carbon black in the rubber mixture, in particular for vehicle tires, ensures the best possible compromise between abrasion resistance and heat buildup, which in turn influences the ecologically relevant rolling resistance. Preference is given here to only one type of carbon black being used in the respective rubber mixture, but it is also possible to mix various types of carbon black into the rubber mixture. But the total amount of carbon blacks present corresponds to a maximum of 300 phr.

The silica may be any of the types of silica known to those skilled in the art that are suitable as filler for tire rubber mixtures. However, particular preference is given to using a finely divided, precipitated silica which has a nitrogen surface area (BET surface area) (in accordance with DIN ISO 9277 and DIN 66132) of 35 to 400 $m^2/g$, preferably 35 to 350 $m^2/g$, more preferably 100 to 320 $m^2/g$ and most preferably 120 to 235 $m^2/g$, and a CTAB surface area (in accordance with ASTM D 3765) of 30 to 400 $m^2/g$, preferably 50 to 330 $m^2/g$, more preferably 100 to 300 $m^2/g$ and most preferably 110 to 230 $m^2/g$. Such silicas lead, for example in rubber mixtures for tire treads, to particularly good physical properties of the vulcanizates. In addition, advantages can arise in processing of the mixture as a result of a reduction in the mixing time while maintaining the same product properties that lead to improved productivity. Silicas used may thus, for example, be either those of the Ultrasil® VN3 type (trade name) from Evonik or highly dispersible silicas known as HD silicas (e.g. Zeosil® 1165 MP from Solvay).

The filler is more preferably at least one silica.

In a preferred embodiment of the invention, the rubber mixture comprises at least one silica as filler, where one or more different silicas having the abovementioned features are conceivable, where the total amount of silicas present is not more than 300 phr.

In this embodiment, the rubber mixture of the invention contains 20 to 300 phr, preferably 20 to 250 phr, more preferably 20 to 150 phr and most preferably 80 to 110 phr of at least one silica.

In an advantageous development of this embodiment of the invention, the rubber mixture does not contain any further filler apart from one or more silica(s).

In a further advantageous development of this embodiment of the invention, the rubber mixture contains exclusively at least one carbon black as a further filler apart from one or more silica(s). The amount of carbon black here is 0.1 to 20 phr, preferably 0.1 to 10 phr, where the total amount of carbon black and silica is not more than 300 phr.

In a preferred embodiment of the invention, the rubber mixture comprises at least one carbon black as filler, where one or more different carbon blacks (carbon black types) having the abovementioned features are conceivable.

In this embodiment, the rubber mixture of the invention contains 20 to 300 phr of at least one carbon black, preferably 20 to 150 phr, more preferably 40 to 150 phr, most preferably 40 to 100 phr.

To improve processability and to attach the silica and any other polar fillers present to the diene rubber, silane coupling agents may be used in rubber mixtures. It is possible here to use one or more different silane coupling agents in combination with one another. The rubber mixture may thus comprise a mixture of different silanes.

The silane coupling agents react with the surface silanol groups of the silica or other polar groups during the mixing of the rubber or of the rubber mixture (in situ) or in the manner of a pretreatment (premodification) even before addition of the filler to the rubber. Silane coupling agents used may be any silane coupling agents known to those skilled in the art for use in rubber mixtures. Such coupling agents known from the prior art are bifunctional organosilanes which have at least one alkoxy, cycloalkoxy or phenoxy group as leaving group on the silicon atom and have, as other functionality, a group which can, optionally after dissociation, undergo a chemical reaction with the double bonds of the polymer. The latter group may, for example, be the following chemical groups:
—SCN, —SH, —NH$_2$ or —S$_x$ (with x=2 to 8).

For example, silane coupling agents used may be 3-mercaptopropyltriethoxysilane, 3-thiocyanatopropyltrimethoxysilane or 3,3'-bis(triethoxysilylpropyl) polysulfides having 2 to 8 sulfur atoms, e.g. 3,3'-bis(triethoxysilylpropyl) tetrasulfide (TESPT), the corresponding disulfide (TESPD), or else mixtures of the sulfides having 1 to 8 sulfur atoms and different contents of the various sulfides. TESPT can, for example, also be added as a mixture with industrial carbon black (X50S® trade name from Evonik). Preference is given to using a silane mixture which contains 40% to 100% by weight of disulfides, more preferably 55% to 85% by weight of disulfides and most preferably 60% to 80% by weight of disulfides.

Blocked mercaptosilanes, as are known, for example, from WO 99/09036, can also be used as silane coupling agent. It is also possible to use silanes as described in WO 2008/083241 A1, WO 2008/083242 A1, WO 2008/083243 A1 and WO 2008/083244 A1. It is possible to use, for example, silanes which are marketed under the NXT name in a number of variants from Momentive, USA, or those that are marketed under the VP Si 363® name by Evonik Industries.

In a preferred embodiment of the invention, the rubber mixture contains a 3,3'-bis(triethoxysilylpropyl) polysulfide having 2 to 8 sulfur atoms as silane, preferably a mixture comprising 70% to 80% by weight of 3,3'-bis(triethoxysilylpropyl) disulfide.

In a further preferred embodiment of the invention, the rubber mixture comprises at least one blocked and/or unblocked mercaptosilane.

What are meant by unblocked mercaptosilanes are silanes which have an —S—H group, i.e. a hydrogen atom on the sulfur atom. What are meant by blocked mercaptosilanes are silanes which have an S-PG group, where PG is the abbreviation for a protecting group on the sulfur atom. Preferred protecting groups, as set out below, are acyl groups.

The expression "blocked and/or unblocked mercaptosilane" means that the rubber mixture of the invention may comprise a blocked silane, an unblocked silane, or a mixture of blocked and unblocked silane.

To the skilled person, it is clear that this detail relates to the initial state of the constituents of the sulfur-crosslinkable rubber mixture, and that the protecting groups are eliminated during the mixing process and/or during vulcanization, and the respective sulfur atoms react chemically.

The blocked and/or unblocked mercaptosilane preferably has the general empirical formula X):
where the R$^7$ radicals within a molecule may be the same or different and are alkoxy groups having 1 to 10 carbon atoms and/or alkyl polyether groups of the —O—((CH$_2$)$_x$—O—)$_z$ R$^9$ form with z=2 to 9 and x=2 to 9, where the R$^9$ radicals within a molecule may be the same or different and are alkyl groups having 10 to 25 carbon atoms, and
where R$^8$ is an acyl group having 1 to 20 carbon atoms or is a hydrogen atom (H), and where Z is an alkyl group having 1 to 10 carbon atoms.

S is the abbreviation for sulfur, Si for silicon, and O for oxygen atom.

A preferred embodiment of the invention concerns at least one blocked mercaptosilane. In a preferred development of this embodiment of the invention, the rubber mixture of the invention does not contain any, i.e. contains 0 phf of, unblocked mercaptosilane, i.e. in this embodiment is free of unblocked mercaptosilane.

Blocked mercaptosilanes bear a protecting group on the sulfur atom, in the present case the R$^8$ group in formula I), and hence are also called "protected mercaptosilanes".

In a preferred embodiment of the blocked mercaptosilane, all the R$^7$ groups are alkoxy groups. More preferably, at least one of the three R$^7$ groups is an ethoxy group. Most preferably, each of the three R$^7$ groups is an ethoxy group (abbreviated to OEt).

In one preferred embodiment of the invention, the blocked mercaptosilane is 3-octanoylthio-1-propyltriethoxysilane, meaning that, in formula I) stated above, all R$^4$ radicals are ethoxy (OEt) and Z is a propyl group and R$^8$ is an octanoyl group. Surprisingly, the combination of the above-described polymer A with a blocked mercaptosilane, especially 3-octanoylthio-1-propyltriethoxysilane, results in a particularly good improvement in the rolling resistance indicators.

The amount of coupling agent is preferably 0.1 to 20 phf, more preferably 1 to 15 phf. The expression phf (parts per hundred parts of filler by weight) used in this text is the conventional unit of amount for coupling agents for fillers in the rubber industry. In the context of the present application, phf relates to the silica present, meaning that any other fillers present, such as carbon black, are not included in the calculation of the amount of silane.

In addition, the rubber mixture may contain further activators and/or agents for the binding of fillers, in particular carbon black. The latter may, for example, be the compound S-(3-aminopropyl)thiosulfuric acid as disclosed, for example, in EP 2589619 A1, and/or metal salts thereof, which gives rise to very good physical properties of the rubber mixture especially in combination with at least one carbon black as filler.

The silanes and activators mentioned are added in the production of the rubber mixture preferably in at least one masterbatch mixing stage.

The rubber mixture of the invention may contain 0 to 150 phr of at least one plasticizer. In a preferred embodiment, the rubber mixture of the invention contains at least one plasticizer, where the total amount of plasticizers is preferably 0.1 to 150 phr. Especially in combination with the above-mentioned constituents, this results in particularly good processibility of the rubber mixture, especially of the extrudates prior to crosslinking, with simultaneously good rolling resistance indicators and good (and hence low) heat buildup. In a preferred embodiment of the invention, the rubber mixture comprises, more particularly and by way of example for inner tire components, 1 to 25 phr of at least one plasticizer.

In a further preferred embodiment of the invention, the rubber mixture comprises, more particularly and by way of example for treads, preferably of winter tires, 30 to 80 phr of at least one plasticizer.

The plasticizers used in the context of the present invention include all the plasticizers that are known to those skilled in the art, such as aromatic, naphthenic or paraffinic mineral oil plasticizers, for example MES (mild extraction solvate) or RAE (residual aromatic extract) or TDAE (treated distillate aromatic extract), or rubber-to-liquid oils (RTL) or biomass-to-liquid oils (BTL) preferably having a content of polycyclic aromatics of less than 3% by weight according to method IP 346 or rapeseed oil or factices or plasticizer resins or liquid polymers having a mean molecular weight (determination by GPC=gel permeation chromatography, in accordance with BS ISO 11344:2004) between 500 and 20 000 g/mol. If additional liquid polymers are used as plasticizers in the rubber mixture of the invention, these are not counted as rubber in the calculation of the composition of the polymer matrix. The plasticizer is preferably selected from the group consisting of the abovementioned plasticizers.

Mineral oils are particularly preferred as plasticizer oils.

When mineral oil is used, it is preferably selected from the group consisting of DAE (distilled aromatic extracts) and/or RAE (residual aromatic extracts) and/or TDAE (treated distilled aromatic extracts) and/or MES (mild extracted solvents) and/or naphthenic oils.

The plasticizer(s) is/are preferably added in at least one masterbatch-mixing stage in the production of the rubber mixture of the invention.

Furthermore, the rubber mixture of the invention may comprise standard additives in customary proportions by weight. These additives include
a) aging stabilizers, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ), N,N'-bis-(1,4-dimethylpentyl)-p-phenylenediamine (77PD),
b) activators, for example zinc oxide and fatty acids (e.g. stearic acid),
c) waxes,
d) resins, especially tackifying resins,
e) masticating aids, for example 2,2'-dibenzamidodiphenyl disulfide (DBD), and
f) processing aids, for example fatty acid salts, for example zinc soaps, and fatty acid esters and derivatives thereof.

Particularly when the rubber mixture of the invention is used for the internal components of a tire or an industrial rubber article which come into direct contact with strengthening elements present, a suitable bonding system, often in the form of tackifying resins, is generally also added to the rubber mixture.

The proportion of the total amount of further additives is 3 to 150 phr, preferably 3 to 100 phr and more preferably 5 to 80 phr.

The total proportion of the further additives includes 0.1 to 10 phr, preferably 0.2 to 8 phr, more preferably 0.2 to 4 phr, of zinc oxide (ZnO).

This may be any type of zinc oxide known to those skilled in the art, for example ZnO pellets or powder. The conventionally used zinc oxide generally has a BET surface area of less than 10 m²/g. However, it is also possible to use what is called nano-zinc oxide having a BET surface area of 10 to 60 m²/g.

The vulcanization is optionally carried out in the presence of sulfur and/or sulfur donors and with the aid of vulcanization accelerators, with some vulcanization accelerators simultaneously being able to act as sulfur donors.

Bonded within polymer A of formula I) are network-forming groups that are involved in the vulcanization and crosslink during the vulcanization. However, the polymer A of formula I), in the context of the present invention, is not one of the sulfur donors.

Sulfur and/or further sulfur donors and also one or more accelerators are added to the rubber mixture in the last mixing step. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

Preference is given to using at least one sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS).

Sulfur donor substances used may be any sulfur donor substances known to those skilled in the art. If the rubber mixture comprises a sulfur-donating substance, it is preferably selected from the group comprising, for example, thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis(O,O-2-ethylhexylthiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

Further network-forming systems as obtainable, for example, under the Vulkuren®, Duralink® or Perkalink® trade names or network-forming systems as described in WO 2010/049216 A2 can also be used in the rubber mixture. This system contains a vulcanizing agent which crosslinks with a functionality of greater than four and at least one vulcanization accelerator. The vulcanizing agent which crosslinks with a functionality of greater than four has, for example, the general formula D):

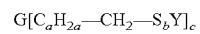

$$G[C_aH_{2a}-CH_2-S_bY]_c \qquad D)$$

where G is a polyvalent cyclic hydrocarbon group and/or a polyvalent heterohydrocarbon group and/or a polyvalent siloxane group containing 1 to 100 atoms; where each Y is selected independently from a rubber-active group containing sulfur-containing functionalities; and where a, b and c are integers where, independently, a=0 to 6; b=0 to 8; and c=3 to 5.

The rubber-active group is preferably selected from a thiosulfonate group, a dithiocarbamate group, a thiocarbonyl group, a mercapto group, a hydrocarbon group and a sodium thiosulfonate group (Bunte salt group).

Very good abrasion and tensile properties of the rubber mixture according to the invention are achieved in this way.

The required amount of further sulfur in the form of elemental sulfur and/or further sulfur donors depends on the field of use of the respective rubber mixture. The respective amounts to be added are known to those skilled in the art. When elemental sulfur is added, the amounts in the case of a rubber mixture for the bead of vehicle tires are, for example, 0 to 5 phr. In the case of treads of vehicle tires, which generally have a lower sulfur content than the bead, the amount of elemental sulfur to be added is preferably 0 to 4 phr.

In an advantageous development of the invention, a plurality of accelerators are used. Preference is given to using a sulfenamide accelerator, more preferably CBS, in combination with the guanidine accelerator DPG (diphenylguanidine). The amount of DPG is 0 to 5 phr, preferably 0.1 to 3 phr, more preferably 0.5 to 2.5 phr, most preferably 1 to 2.5 phr.

In addition, vulcanization retarders may be present in the rubber mixture.

The present invention further provides a process for producing a sulfur-crosslinkable rubber mixture. The process of the invention comprises a) the mixing of 10 to 100 phr of at least one modified polymer A which has been prepared as described above with 0 to 90 phr of at least one further rubber and 20 to 300 phr of at least one filler for production of a rubber base mixture, and b) the subsequent mixing with at least one sulfur donor and/or elemental sulfur and/or at least one vulcanization accelerator for production of a finished rubber mixture, as detailed above. This is preferably followed by a vulcanization.

All the statements made above relating to polymer A and the other constituents of the rubber mixture of the invention are analogously applicable to the process of the invention.

Such a process provides a rubber mixture which, by comparison with prior art rubber mixtures, has an improvement in the trade-off between rolling resistance and wet grip, with abrasion characteristics remaining at a comparable level or likewise being improved.

It is essential to the invention that the polymer, as already set out above for the rubber mixture of the invention, is modified along the polymer chains P before being mixed into the rubber mixture.

The mere mixing of a polymer with a modifier and subsequent further processing to form or in a rubber mixture, as disclosed in WO2008/076875A1, does not lead to such a surprising improvement in the trade-off between rolling resistance and wet grip; see tab. 4.

The rubber mixture is otherwise produced by the process which is customary in the rubber industry and in which a base mixture comprising all constituents apart from the vulcanization system (sulfur and vulcanization-influencing substances) is firstly produced in one or more mixing stages. The final mixture is produced by adding the vulcanization system in a final mixing stage. The finished mixture is processed further, for example, by an extrusion operation and converted to the appropriate shape.

The present invention further provides a vulcanizate which is obtained by sulfur vulcanization of at least one rubber mixture of the invention comprising the polymer A and at least one filler. What is provided by the invention here is thus the vulcanized rubber mixture.

All the statements made above relating to polymer A and the other constituents of the rubber mixture of the invention are analogously applicable to the vulcanizate of the invention.

For use in vehicle tires, the mixture is preferably brought into the shape of a tread and applied in a known manner in the production of the vehicle tire blank. However, the tread can also be rolled up in the form of a narrow strip of rubber mixture onto a tire blank. In the case of two-part treads (upper part: cap and lower part: base), the rubber mixture of the invention can be used both for the cap and for the base.

The rubber mixture of the invention for use as body mixture in vehicle tires is produced as described above for the tread. The difference lies in the shaping after the extrusion operation. The resulting shapes of the rubber mixture of the invention for one or more different body mixtures then serve for construction of a tire blank.

The invention will now be illustrated in detail with the aid of comparative examples and working examples which are summarized in tables 1 to 3.

"Room temperature" (RT) as used herein refers to a temperature of about 20-25° C. or, in the case of measurement of a specific parameter, of 20° C.

Synthesis of the Polymer Backbone Modifier BM1

Hexane-1,6-dithiol (12.7 g, 84.2 mmol) was dissolved in 300 mL of tert-butyl methyl ether, and n-BuLi (30.0 g mL, 92.5 mmol, 20% by weight in cyclohexane) was added dropwise. The mixture was stirred at room temperature for 2 h, and tert-butyldimethylchlorosilane was added (12.6 g, 83.7 mmol). After the mixture had been refluxed overnight, water was added. The organic phase was removed and washed twice with water. The collected aqueous phases were combined and washed with diethyl ether. The collected and combined organic phases were dried with sodium sulfate, and the volatile constituents were removed under reduced pressure. The residue was fractionally distilled to obtain a yield of 64% of BM1, boiling point 105° C. at 0.2 mbar.

$^1$H NMR (400 Hz, C$_6$D$_6$, 298 K): δ=0.21 (s, 6H, Si (CH$_3$)$_2$); 0.99 (s, 9H, C(CH$_3$)$_3$); 1.15-1.05 (m, 3H, CH$_2$/SH); 1.23-1.15 (m, 2H, CH$_2$); 1.29 (qu, 2H, CH$_2$); 1.50 (qu, 2H, CH$_2$); 2.12 (q, 2H, CH$_2$—SH); 2.40 (t, 2H, CH$_2$—S—Si); $^{13}$C NMR (101 Hz, C$_6$D$_6$, 298 K): δ=–3.09 (CH$_3$), 19.50 (CH$_2$), 24.90 (CH$_2$), 26.91 (CH$_3$), 27.04 (CH$_2$), 28.43 (CH$_2$), 28.67 (CH$_2$), 33.63 (CH$_2$), 34.53 (CH$_2$).

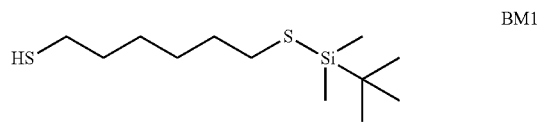

BM1

Copolymerization of 1,3-Butadiene with Styrene (Comparative Polymer V)

The copolymerization was conducted in a jacketed 40 L steel reactor that was purged with nitrogen prior to the addition of the organic solvent, the monomers, the polar coordinator compound, the initiator compound and other components. The following components were added in the sequence specified: cyclohexane solvent (18 560 g); butadiene monomer (1777 g), styrene monomer (448 g) and tetramethylethylenediamine (TMEDA, 1.0 g), and the mixture was heated to 40° C., followed by titration with n-butyllithium to remove traces of moisture or other impurities. n-BuLi (17.6 mmol) was added to the polymerization reactor to initiate the polymerization reaction. The polymerization was conducted for 20 minutes, in the course of which the polymerization temperature was not allowed to rise to more than 70° C. Then butadiene (1202 g) and styrene (91 g) as monomers were added over the course of 55 min. The polymerization was conducted for a further 20 minutes, followed by the addition of 63 g of butadiene monomer. After 20 minutes, the polymerization was terminated by addition of methanol (one equivalent based on the initiator). 0.25% by weight of IRGANOX 1520, based on the total monomer weight, was added to the polymer solution as stabilizer. This mixture was stirred for 10 minutes. The resulting polymer solution was then stripped with steam for one hour in order to remove solvents and other volatile substances, and dried in an oven at 70° C. for 30 minutes and then additionally at room temperature for three days.

Preparation of Backbone-Modified Polymer A

First of all, the copolymerization of 1,3-butadiene and styrene was conducted analogously to the preparation of the comparative polymer V. The backbone modification was conducted in a jacketed 10 L steel reactor that had first been purged with nitrogen before the comparative polymer V (4000 g) was added, followed by the addition of cyclohexane (2000 g) and the backbone modifier BM1 (7.7 g, 29.1 mmol). The mixture was heated to 95° C., and lauroyl peroxide solution in cyclohexane was added in 4 portions every 30 minutes (1.13/0.86/0.57/0.28 mmol, total of 2.84 mmol). The polymer solution was cooled down to room temperature, and 1.2 g of IRGANOX 1520 were added. A GC analysis of the unconverted backbone modifier BM1 showed a graft yield of 60%. The modified polymer solution was then stripped with steam for one hour in order to remove solvents and other volatile substances, and dried in an oven at 70° C. for 30 minutes and then additionally at room temperature for three days.

Preparation of Polymer A' by Extraction of the Unconverted Backbone Modifier BM1 from Polymer A Polymer A (94 g) was comminuted in a granulator, and the rubber crumbs obtained were suspended in isopropanol (800 g). The suspension was refluxed for 8 hours, and the rubber crumbs were removed and dried. A GC analysis showed that 90% of the backbone modifier BM1 present had been removed.

TABLE 1

Analytical data for the comparative polymer V and polymer A

|  | Mw [g/mol] | Mn [g/mol] | Mooney viscosity | Vinyl content [% by wt.] | Styrene content [% by wt.] | Tg [° C.] |
|---|---|---|---|---|---|---|
| Comparative polymer V | 334417 | 303967 | 35.3 | 29.2 | 15.1 | −60.6 |
| Polymer A | 476469 | 358682 | 66.2 | 29.6 | 14.7 | −60.7 |

Production of Rubber Mixtures and Comparative Tests

The mixtures marked "I" are here mixtures of the invention, while the mixtures marked "C" are comparative mixtures. In all the examples of mixtures in tables 2 to 4, the stated amounts are in parts by weight based on 100 parts by weight of total rubber (phr) or on 100 parts by weight of silica (phf).

The mixture was produced under standard conditions in two stages in a laboratory tangential mixer.

The inventive rubber mixtures I1, I2 and I4 contain 90 phr of polymer A (formula I). In the rubber mixtures C1, C3 and C4, rather than a polymer of formula I), the comparative polymer V having a comparable molecular weight, a comparable vinyl content and a comparable styrene content to polymer A was used. The comparative polymer is unmodified and is not a coupled polymer. Rubber mixture C2 has been adjusted with a greater amount of vulcanizing agents (accelerator and sulfur) to the same hardness at 70° C. as I1 and is thus the reference of equal hardness. The inventive rubber mixture I3 contains the polymer A' which has been obtained after completion of modification from the polymer A by purification, i.e. removal of any residual modifier BM1.

All mixtures were used to produce test specimens by vulcanization, and these test specimens were used to determine material properties typical for the rubber industry. For the above-described tests on test specimens, the following test methods were employed:

Shore A hardness (unit: Shore A, abbreviated to ShA) at room temperature (RT) and at 70° C. in accordance with DIN 53 505

Rebound resilience (resilience) at room temperature (RT) and 70° C. in accordance with DIN 53 512

Stress values at 50%, 100%, 200%, 300% elongation (50 modulus, 100 modulus, 200 modulus and 300 modulus respectively) at room temperature (RT) in accordance with DIN 53 504 with the ring test specimens: C1, C2, I1, C3, I2, I3, C5, C6, C7 and S3 specimen from 2 mm frame: C4, I4, C8, C9, C10

Tensile strength and elongation at break at room temperature in accordance with DIN 53 504

Abrasion at room temperature in accordance with DIN 53 516 or DIN/ISO 4649

Maximum loss factor tan δ (max) from dynamic-mechanical measurement in accordance with DIN 53 513 (temperature sweep)

Substances Used
a) Aging stabilizers: antiozonant wax and 6PPD
b) Silica: VN3, from Evonik
c) Silane: S2 silane, 75% by weight of disulfides, for example Si 266® from Evonik Industries AG
d) Blocked mercaptosilane: NXT, 3-(octanoylthio)-1-propyltriethoxysilane, from Momentive
e) Modifier: hexane-1,6-dithiol
f) Modifier: double-protected hexane-1,6-dithiol:

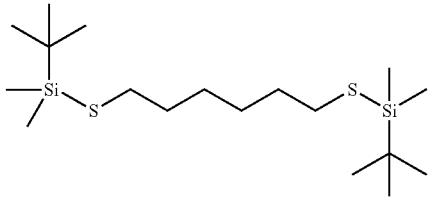 [SMILES: CC(C)(C)[Si](C)(C)SCCCCCCS[Si](C)(C)C(C)(C)C]

TABLE 2

|  | Unit | C1 | C2 | I1 |
|---|---|---|---|---|
| Constituents |  |  |  |  |
| NR TSR | phr | 10 | 10 | 10 |
| Comparative polymer V | phr | 90 | 90 | — |
| Polymer A | phr | — | — | 90 |
| N339 carbon black | phr | 85 | 85 | 85 |
| TDAE oil | phr | 45 | 45 | 45 |
| Aging stabilizer a) | phr | 4 | 4 | 4 |
| Stearic acid | phr | 2.5 | 2.5 | 2.5 |
| Zinc oxide | phr | 2.5 | 2.5 | 2.5 |
| CBS accelerator | phr | 6.4 | 9.6 | 6.4 |
| Sulfur | phr | 0.64 | 0.96 | 0.64 |
| Physical properties |  |  |  |  |
| Shore hardness at RT | Shore A | 65 | 68 | 66 |
| Shore hardness at 70° C. | Shore A | 60.4 | 64 | 64 |
| Rebound resilience at RT | % | 31 | 31.8 | 37.8 |
| Rebound resilience at 70° C. | % | 45.8 | 49.1 | 55.3 |
| Diff. rebound (70° C. - RT) |  | 14.8 | 17.3 | 17.5 |
| 50 modulus | MPa | 1.4 | 1.7 | 1.8 |
| 100 modulus | MPa | 2.5 | 3.5 | 4.2 |
| Tensile strength | MPa | 11.7 | 11.7 | 11.3 |
| Elongation at break | % | 342 | 265 | 206 |
| Tan δ (max) |  | 0.259 | 0.243 | 0.188 |
| Abrasion | mm³ | 94 | 129 | 92 |

TABLE 3

| Constituents | Unit | C3 | I2 | I3 | C4 | I4 |
|---|---|---|---|---|---|---|
| NR TSR | phr | 10 | 10 | 10 | 10 | 10 |
| Comparative polymer V | phr | 90 | — | — | 90 | — |
| Polymer A | phr | — | 90 | — | — | 90 |
| Polymer A' | phr | — | — | 90 | — | — |
| Silica [b)] | phr | 95 | 95 | 95 | 95 | 95 |
| Silane [d)] | phf | 7.2 | 7.2 | 7.2 | — | — |
| Silane [d)] | phf | — | — | — | 8.1 | 8.1 |
| TDAE oil | phr | 35 | 35 | 35 | 35 | 35 |
| Ag. st. [a)] | phr | 4 | 4 | 4 | 4 | 4 |
| Stearic acid | phr | 2.5 | 2.5 | 2.5 | 2.5 | 2.5 |
| Zinc oxide | phr | 2.5 | 2.5 | 2.5 | 2.5 | 2.5 |
| DPG | phr | 2.0 | 2.0 | 2.0 | 2.0 | 2.0 |
| CBS | phr | 6.4 | 6.4 | 6.4 | 6.4 | 6.4 |
| Sulfur | phr | 0.64 | 0.64 | 0.64 | 0.64 | 0.64 |
| Physical properties | | | | | | |
| Hardness RT | Shore A | 74.2 | 73.9 | 76 | 72.7 | 70.2 |
| Hardness 70° C. | Shore A | 69.6 | 70.6 | 72.2 | 68.7 | 68.3 |
| Rebound RT | % | 36.9 | 41 | 40.5 | 37.0 | 45.6 |
| Rebound 70° C. | % | 47.4 | 55.9 | 54.6 | 48.8 | 62.8 |
| Diff. rebound | | 10.5 | 14.9 | 14.1 | 11.8 | 17.2 |
| 50 modulus | MPa | 1.8 | 2.1 | 2.1 | — | — |
| 100 modulus | MPa | 2.9 | 4.2 | 4 | 2.9 | 3.3 |
| 200 modulus | MPa | 5.6 | 10 | 10.1 | 5.5 | 8.1 |
| Tensile strength | MPa | 16.4 | 15 | 18 | 14.9 | 14.6 |
| Elongation at break | % | 506 | 296 | 329 | 472 | 308 |
| Tan δ (max) | | 0.212 | 0.167 | 0.174 | 0.189 | 0.127 |
| Abrasion | mm$^3$ | 61 | 77 | 58 | 69 | 95 |

TABLE 4

| Constituents | Unit | C5 | C6 | C7 | C8 | C9 | C10 |
|---|---|---|---|---|---|---|---|
| NR TSR | phr | 10 | 10 | 10 | 10 | 10 | 10 |
| Comparative polymer V | phr | 90 | 90 | 90 | 90 | 90 | 90 |
| Modifier [e)] | phr | — | 0.85 | 3.0 | — | 3.0 | — |
| Modifier [f)] | phr | — | — | — | — | — | 7.75 |
| N339 carbon black | phr | — | — | — | 85 | 85 | 85 |
| Silica [b)] | phr | 95 | 95 | 95 | — | — | — |
| Silane [c)] | phf | 7.2 | 7.2 | 7.2 | — | — | — |
| TDAE oil | phr | 35 | 35 | 35 | 45 | 45 | 45 |
| Ag. st. [a)] | phr | 4 | 4 | 4 | 4 | 4 | 4 |
| Stearic acid | phr | 2.5 | 2.5 | 2.5 | 2.5 | 2.5 | 2.5 |
| Zinc oxide | phr | 2.5 | 2.5 | 2.5 | 2.5 | 2.5 | 2.5 |
| DPG | phr | 2.0 | 2.0 | 2.0 | — | — | — |
| CBS | phr | 6.4 | 6.4 | 6.4 | 6.4 | 6.4 | 6.4 |
| Sulfur | phr | 0.64 | 0.64 | 0.64 | 0.64 | 0.64 | 0.64 |
| Physical properties | | | | | | | |
| Hardness RT | Shore A | 74.1 | 75.8 | 73.4 | 64 | 60 | 56 |
| Hardness 70° C. | Shore A | 69.6 | 71.0 | 68.2 | 59 | 55 | 49 |
| Rebound RT | % | 18.0 | 17.8 | 18.5 | 18 | 19 | 20 |
| Rebound 70° C. | % | 46.5 | 48.0 | 47.6 | 37 | 40 | 35 |
| Diff. rebound | | 28.5 | 30.2 | 29.1 | 19 | 21 | 15 |
| 50 modulus | MPa | 2.0 | 2.2 | 1.8 | — | — | — |
| 100 modulus | MPa | 3.7 | 3.9 | 3.1 | 2.09 | 1.90 | 1.24 |
| 200 modulus | MPa | 7.3 | 7.7 | 6.1 | 5.63 | 5.17 | 2.79 |
| Tensile strength | MPa | 12 | 11 | 12 | 14.4 | 14.3 | 12.9 |
| Elongation at break | % | 318 | 288 | 368 | 412 | 459 | 627 |
| Tan δ (max) | | 0.196 | 0.195 | 0.206 | 0.272 | 0.268 | 0.299 |
| Abrasion | mm$^3$ | 175 | 135 | 146 | 181 | 211 | 312 |

As apparent from table 1, the inventive rubber mixture I1 comprising carbon black as filler, compared to the comparative mixture C1, shows an improvement in the trade-off between rolling resistance and wet grip, which is apparent from the greater difference in the two indicators of rebound resilience at 70° C. (rolling resistance) and room temperature (wet grip). Moreover, the improved rolling resistance of I1 is apparent from the lower value for maximum loss factor (tan δ max.). In addition, the inventive rubber mixture I1 compared to C1 shows comparable abrasion characteristics and comparable tensile strength. Compared with the equal-hardness reference C2, the inventive rubber mixture I1 shows a distinct improvement in abrasion characteristics.

As can be seen from table 2, the inventive rubber mixtures I2, I3 and I4 comprising silica as filler, compared to the respective comparative mixtures C3 and C4, show an improvement in the trade-off between rolling resistance and wet grip, which is apparent from the greater differences in the two indicators of rebound resilience at 70° C. (rolling resistance) and room temperature (wet grip). It appears here that the purification of the polymer on completion of modification (I3 with purified modified polymer A' vs. I2 with modified polymer A) does not have any significant effect on the improvement in the trade-off between rolling resistance and wet grip. The abrasion characteristics of I2 and I4, by comparison with the respective comparative mixtures, are at an acceptable level, whereas I3 comprising the purified polymer A' surprisingly exhibits good abrasion characteristics. It is thus possible with the rubber mixture of the invention, especially through the use in the tread, to further improve the trade-off between rolling resistance and wet grip characteristics on the basis of the prior art without any deterioration in abrasion resistance. As can be seen from table 3, the improvements are not observed either with hexane-1,6-dithiol (C6 or C7 versus C5 and C9 versus C8) or with the double-protected hexane-1,6-dithiol (C10 versus C8), which are added as modifiers to the comparative polymer V in the mixing of the rubber mixture and have not been linked to the polymer beforehand. Here there is either a deterioration in the differences in the rebound resiliences and tangent delta, or they remain at a similar level with a deterioration in the abrasion characteristics.

It is thus essential to the invention that polymer A has already been modified as per formula I) before it is mixed into the rubber mixture together with the other mixture constituents, and there is no separate addition of unmodified polymer and modifier to the rubber mixture.

The invention claimed is:

1. A sulfur-crosslinkable rubber mixture comprising at least the following constituents:
   at least one filler; and,
   10 to 100 phr of at least one polymer A of the following formula I):

wherein
   S is a sulfur atom,
   P is a polymer chain which is obtained by anionic polymerization of at least one conjugated diene and optionally one or more vinylaromatic compounds and which has optionally been chain end-modified,
   $R^1$ is selected from $C_1$-$C_8$-alkyl,
   $R^2$ is selected from —$SiR^3R^4R^5$ in which $R^3$, $R^4$ and $R^5$ are selected from H, $C_1$-$C_{16}$-alkyl, $C_6$-$C_{16}$-aryl and $C_7$-$C_{16}$-aralkyl, and
   n is an integer selected from 1 to 200; and,
   wherein the —S—$R^1$—S—$R^2$ group(s) are bonded to the backbone of the polymer chain P.

2. The rubber mixture as claimed in claim 1, wherein the at least one conjugated diene is selected from the group consisting of 1,3-butadiene, 2-($C_1$-$C_5$-alkyl)-1,3-butadiene, especially isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene and 1,3-cyclooctadiene.

3. The rubber mixture as claimed in claim 2, wherein the at least one conjugated diene is 1,3-butadiene.

4. The rubber mixture as claimed in claim 1, wherein the vinylaromatic compound is selected from the group consisting of styrene, $C_1$-$C_4$-alkyl-substituted styrene, especially 2-methylstyrene, 3-methylstyrene, 4-methylstyrene, 2,4-dimethylstyrene, 2,4,6-trimethylstyrene, α-methylstyrene, 2,4-diisopropylstyrene and 4-tert-butylstyrene, stilbene, vinylbenzyldimethylamine, 4-vinylbenzyl dimethylaminoethyl ether, N,N-dimethylaminoethylstyrene, tert-butoxystyrene, vinylpyridine, 1,2-divinylbenzene, 1,3-divinylbenzene and 1,4-divinylbenzene, and any mixture of two or more of these.

5. The rubber mixture as claimed in claim 4, wherein the vinylaromatic compound is styrene.

6. The rubber mixture as claimed in claim 1, wherein the filler is at least one silica and/or at least one carbon black.

7. The rubber mixture as claimed in claim 1, wherein the rubber mixture contains 20 to 300 phr of said at least one filler.

8. The rubber mixture as claimed in claim 1, wherein it contains 40 to 90 phr of the at least one polymer A and 10 to 60 phr of at least one further rubber.

9. The rubber mixture as claimed in claim 8, wherein the at least one further rubber is a diene rubber selected from the group consisting of natural polyisoprene, synthetic polyisoprene, butadiene rubber and styrene-butadiene rubber.

10. A vulcanizate which is obtained by sulfur vulcanization of at least one rubber mixture as claimed in claim 1.

11. A vehicle tire comprising at least one vulcanizate of at least one rubber mixture as claimed in claim 10 in at least one component.

* * * * *